United States Patent
Peng

(10) Patent No.: US 11,481,402 B2
(45) Date of Patent: Oct. 25, 2022

(54) SEARCH RANKING METHOD AND APPARATUS, ELECTRONIC DEVICE AND STORAGE MEDIUM

(71) Applicant: Tianjin Bytedance Technology Co., Ltd., Tianjin (CN)

(72) Inventor: Zhao Peng, Beijing (CN)

(73) Assignee: Tianjin Bytedance Technology Co., Ltd., Tianjin (CN)

( * ) Notice: Subject to any disclaimer, the term of this patent is extended or adjusted under 35 U.S.C. 154(b) by 176 days.

(21) Appl. No.: 16/760,414

(22) PCT Filed: Nov. 1, 2018

(86) PCT No.: PCT/CN2018/113428
§ 371 (c)(1),
(2) Date: Apr. 29, 2020

(87) PCT Pub. No.: WO2020/019565
PCT Pub. Date: Jan. 30, 2020

(65) Prior Publication Data
US 2020/0341988 A1   Oct. 29, 2020

(30) Foreign Application Priority Data
Jul. 27, 2018   (CN) .......................... 201810848394.4

(51) Int. Cl.
*G06F 16/2457* (2019.01)
*G06F 16/953* (2019.01)

(52) U.S. Cl.
CPC ...... *G06F 16/24578* (2019.01); *G06F 16/953* (2019.01)

(58) Field of Classification Search
CPC .......................... G06F 16/24578; G06F 16/953
(Continued)

(56) References Cited

U.S. PATENT DOCUMENTS 7,617,176 B2 *  11/2009  Zeng .................... G06F 16/951
2008/0177994 A1 *  7/2008  Mayer .................... G06F 16/00
                                                    709/224
(Continued)

FOREIGN PATENT DOCUMENTS

CN       101158971 A     4/2008
CN       102298594 A    12/2011
(Continued)

OTHER PUBLICATIONS

International Patent Application No. PCT/CN2018/113428; Int'l Search Report; dated Apr. 28, 2019; 2 pages.

*Primary Examiner* — Mark E Hershley
(74) *Attorney, Agent, or Firm* — BakerHostetler

(57) ABSTRACT

The present application relates to a search ranking method, a search ranking apparatus, an electronic device and a storage medium. In an embodiment of the method, acquiring search keywords and determining a plurality of initial search results that match with the keywords; acquiring a plurality of characteristic factors associated with each of the initial search results, and a weight of each of the characteristic factors; performing a fusion calculation on each of the initial search results according to the weights of the plurality of characteristic factors to obtain a comprehensive weight of each initial search result; and ranking the plurality of initial search results according to the comprehensive weights. In embodiments of the present application, comprehensive ranking is performed on initial search results of a plurality of columns, which enables the user to quickly find a desired result, saves the operation time, and improves the searching efficiency.

19 Claims, 3 Drawing Sheets

(58) Field of Classification Search
USPC .......................................................... 707/706
See application file for complete search history.

(56) References Cited

U.S. PATENT DOCUMENTS

| | | | | |
|---|---|---|---|---|
| 2008/0219352 | A1* | 9/2008 | Tokumitsu | H04N 19/46 375/E7.262 |
| 2008/0294624 | A1* | 11/2008 | Kanigsberg | G06F 16/9535 707/999.005 |
| 2009/0055185 | A1* | 2/2009 | Nakade | G10L 15/30 704/E15.001 |
| 2010/0306185 | A1* | 12/2010 | Smith | G06F 16/9538 707/738 |
| 2011/0238662 | A1* | 9/2011 | Shuster | G06F 16/248 707/E17.071 |
| 2012/0008499 | A1* | 1/2012 | Stanwood | H04L 47/623 370/235 |
| 2012/0290950 | A1* | 11/2012 | Rapaport | H04L 12/1818 715/753 |
| 2013/0013682 | A1* | 1/2013 | Juan | G06Q 50/01 709/204 |
| 2014/0012860 | A1* | 1/2014 | Kandur Raja | G06F 16/313 707/748 |
| 2014/0075004 | A1* | 3/2014 | Van Dusen | H04L 41/04 709/223 |
| 2014/0359029 | A1* | 12/2014 | Jagadish | H04L 51/42 709/206 |
| 2016/0283481 | A1* | 9/2016 | Morley | G06N 5/04 |
| 2016/0360382 | A1* | 12/2016 | Gross | H04W 4/50 |
| 2017/0091335 | A1* | 3/2017 | Liu | G06Q 50/01 |
| 2017/0168692 | A1* | 6/2017 | Chandra | G06F 3/04842 |
| 2018/0102947 | A1* | 4/2018 | Bhaya | H04L 51/212 |
| 2020/0007476 | A1* | 1/2020 | Aniyan | H04L 51/046 |

FOREIGN PATENT DOCUMENTS

| | | |
|---|---|---|
| CN | 102368260 A | 3/2012 |
| CN | 102385585 A | 3/2012 |
| CN | 102902681 A | 1/2013 |
| CN | 103635903 A | 3/2014 |
| CN | 104899200 A | 9/2015 |
| CN | 106682925 A | 5/2017 |

* cited by examiner

SEARCH RANKING METHOD AND APPARATUS, ELECTRONIC DEVICE AND STORAGE MEDIUM

CROSS-REFERENCE TO RELATED APPLICATIONS

The present application is the national phase application of International Patent Application No. PCT/CN2018/113428, titled "Search Ranking Method and Apparatus, Electronic Device and Storage Medium", filed on Nov. 1, 2018, which claims priority to Chinese patent application No. 201810848394.4, titled "Search Ranking Method and Apparatus, Computer Device and Storage Medium", filed by the applicant "Tianjin Bytedance Technology Co., Ltd" on Jul. 27, 2018 with the Chinese Patent Office, both of which are incorporated herein by reference in their entities.

FIELD OF THE INVENTION

The present application relates to the technical field of enterprise instant messaging systems, and in particular to a search ranking method, a search ranking apparatus, an electronic device and a storage medium.

BACKGROUND OF THE INVENTION

With the rapid development of smart devices, more and more chat applications have emerged, and the use of chat applications enables users far away from each other to communicate. The chat applications include personal chat applications and enterprise chat applications. During the use of the enterprise chat applications, when the user needs to search for relevant information, a search function is activated, such as searching for chat information, contacts or group chats, so that the relevant information can be quickly found or a chat link can be quickly established.

At present, the following problem exists when the search function of the enterprise chat application is implemented: initial search results of the enterprise chat application are displayed separately according to different objects, wherein information such as contacts, group chats, messages and the like are displayed in separate columns; moreover, the displayed objects are ranked in a chronological order, and the user searches for relevant information according to the displayed columns, making the operation cumbersome and time consuming.

SUMMARY OF THE INVENTION

On this basis, it is necessary to provide a search ranking method, a search ranking apparatus, an electronic device, and a storage medium that enable users to quickly find relevant information in view of the above technical problems.

One aspect of the present application provides a search ranking method, which includes:

acquiring search keywords and determining a plurality of initial search results that match with the keywords;

acquiring a plurality of characteristic factors associated with each of the initial search results, and a weight of each of the characteristic factors;

performing a fusion calculation on each of the initial search results according to the weights of the plurality of characteristic factors to obtain a comprehensive weight of each initial search result; and ranking the plurality of initial search results according to the comprehensive weights.

In one of the embodiments, the plurality of characteristic factors include at least one of text similarity, chat update time, score of initially recalling search engine, department resemblance, objective importance of contacts, number of chat messages, click rate, and user's relevance degree; and the acquiring the plurality of characteristic factors associated with each of the initial search results and the weight of each of the characteristic factors includes:

acquiring characteristic factors included in the initial search result according to fields of the initial search result; wherein the fields include at least one of object type, object status, object name, score of initially recalling search engine, chat update time, position of the latest message, Chinese pinyin name of the object, English name of the object, and the department in which the object is located; and calculating a weight corresponding to each of the characteristic factors respectively according to the information in the fields; wherein the weight corresponding to the characteristic factor includes at least one of a weight of the text similarity, a weight of the chat update time, a weight of the score of initially recalling search engine, a weight of the department resemblance, a weight of the objective importance of contacts, a weight of the number of chat messages, a weight of the click rate, and a weight of the user's relevance degree.

In one of the embodiments, the calculating the weight of the text similarity includes: calculating a hit ratio, a sequence consistency indicator, a position tightness, and a coverage ratio of the keywords in the initial search results; and calculating the weight of the text similarity according to the hit ratio, the sequence consistency indicator, the position tightness, and the coverage ratio.

In one of the embodiments, the step of calculating the weight of the text similarity according to the hit ratio, the sequence consistency indicator, the position tightness and the coverage ratio includes:

acquiring an offset value and a correction value respectively, according to the hit ratio, the sequence consistency indicator, the position tightness, and the coverage ratio; and performing a fusion calculation according to the hit ratio, the sequence consistency indicator, the position tightness, the coverage ratio, the offset value and the correction value to obtain the weight of the text similarity.

In one of the embodiments, the calculating the weight of the chat update time includes:

acquiring a time interval between the last chat time and the current time according to the initial search results; and calculating a ratio of an attenuation constant to the sum of the time interval and the attenuation constant to obtain the weight of the chat update time.

In one of the embodiments, the calculating the weight of the score of initially recalling search engine includes:

scoring the initial search results according to a term frequency-inverse document frequency model to obtain the weight of the score of initially recalling search engine.

In one of the embodiments, the calculating the weight of the department resemblance includes:

comparing a department in the initial search result with a department in which the user currently searching is in;

if they are the same department, setting the weight of the department resemblance to 1; and if they are not the same department, setting the weight of the department resemblance to 0.

In one of the embodiments, the calculating the weight of the objective importance of the contacts includes:

acquiring a position level, a ratio of the number of published articles, concerned data, and liked data of the initial search results; and calculating the weight of the objective importance of the contacts according to the position level, the ratio of the number of published articles, the concerned data, and the liked data.

In one of the embodiments, the calculating the weight of the objective importance of the contacts according to the position level, the ratio of the number of published articles, the concerned data, and the liked data includes:

acquiring an offset value and a correction value respectively, according to the position level, the ratio of the number of published articles, the concerned data, and the liked data; and performing a fusion calculation according to the position level, the ratio of the number of published articles, the concerned data, the liked data, the offset value and the correction value to obtain the weight of the objective importance of the contacts.

In one of the embodiments, the calculating the weight of the number of chat messages includes:

acquiring a total number of chat messages between the initial search results and the user currently searching;

acquiring a parameter r of the total number of chat messages; and calculating the weight of the number of chat messages according to the total number of chat messages and the parameter r;

wherein the unit of the parameter r is quantity.

In one of the embodiments, the calculating the weight of the click rate includes:

acquiring the number of user clicks of the initial search results; and assigning a value to the weight of the click rate according to the number of user clicks; wherein the weight of the click rate is in direct proportional to the number of user clicks.

In one of the embodiments, the calculating the weight of the user's relevance degree includes:

calculating the number of common contacts, the characteristic number of common departments, the characteristic number of common office locations, and the number of common personal tags of the initial search results and the user currently searching; and calculating the weight of the user's relevance degree according to the number of common contacts, the characteristic number of common departments, the characteristic number of common office locations, and the number of common personal tags.

In one of the embodiments, the performing fusion calculation on each of the initial search results according to the weights of the plurality of characteristic factors to obtain the comprehensive weight of each initial search result includes:

acquiring an offset value and a correction value respectively, according to each of the characteristic factors of the initial search result;

obtaining a fusion coefficient by calculating a sum of a product of the characteristic factor and the corresponding offset value, and the corresponding correction value; and multiplying the fusion coefficients of the plurality of characteristic factors to obtain the comprehensive weight of the initial search result.

Another aspect of the present application provides a search ranking apparatus, which includes:

an initial search result extraction module, configured to acquire search keywords and determine a plurality of initial search results that match with the keywords;

a characteristic factor extraction module, configured to acquire a plurality of characteristic factors associated with each of the initial search results, and a weight of each of the characteristic factors;

a weight calculation module, configured to perform a fusion calculation on each of the initial search results according to the plurality of characteristic factors and the weight of each characteristic factor to obtain a comprehensive weight of each initial search result; and a ranking module, configured to rank the plurality of initial search results according to the comprehensive weights.

Further another aspect of the present application provides an electronic device including a memory having a computer program stored thereon, and a processor, wherein when the computer program is executed by the processor, steps of the method according to any one of claims 1 to 13 are implemented.

Still another aspect of the present application provides a computer readable storage medium having a computer program stored thereon, wherein when the computer program is executed by a processor, steps of the method according to any one of claims 1 to 13 are implemented.

With the above search ranking method, search ranking apparatus, electronic device and storage medium, the initial search results are acquired from a plurality of columns to ensure that the acquired information is more comprehensive, wherein in an enterprise communication tool, there may be multiple types of columns, and if one of the columns is missing, search failure may occur; then, by performing weight calculation based on the initial search results, a unified ranking standard is achieved, which provides a basis for comprehensive ranking; finally, comprehensive ranking is performed based on the weights, which facilitates users in quickly finding relevant information, simplifies the operation, and improves the searching efficiency.

BRIEF DESCRIPTION OF THE DRAWINGS

In order to illustrate the technical solutions in the embodiments of the present disclosure more clearly, one or more embodiments will be illustratively described below with reference to the figures in the corresponding accompanying drawings, and the illustrative description should not be construed as limiting the embodiments, wherein.

DETAILED DESCRIPTION OF THE EMBODIMENT(S) OF THE INVENTION

In order to make the objects, technical solutions and advantages of the present application more clearly understood, the present application will be further described below in detail with reference to the accompanying drawings and embodiments. It should be understood that the specific embodiments described herein merely serve to explain the present application, and are not intended to limit the present application.

Figure 1:
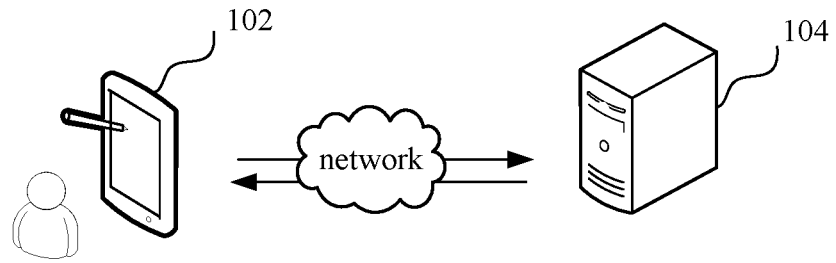
FIG. 1 is an application environment diagram of a search ranking method according to an embodiment.

The search ranking method provided by the present application may be applied to an application environment as shown in FIG. 1. A terminal 102 communicates with a server 104 via a network. Search keywords are entered at the terminal 102, and the server 104 acquires the search keywords and determines a plurality of initial search results that match with the keywords; a plurality of characteristic factors associated with each of the initial search results, and a weight of each of the characteristic factors are acquired; a fusion calculation is performed on each of the initial search results according to the weights of the plurality of characteristic factors to obtain a comprehensive weight of each initial search result; and the plurality of initial search results are ranked according to the comprehensive weights, and a result of the comprehensive ranking is displayed in the terminal 102. The terminal 102 may be, but is not limited to, various personal computers, notebook computers, smart phones, tablets, and portable wearable devices. The server 104 may be implemented by an independent server, or a server cluster composed of a plurality of servers.

Figure 2:
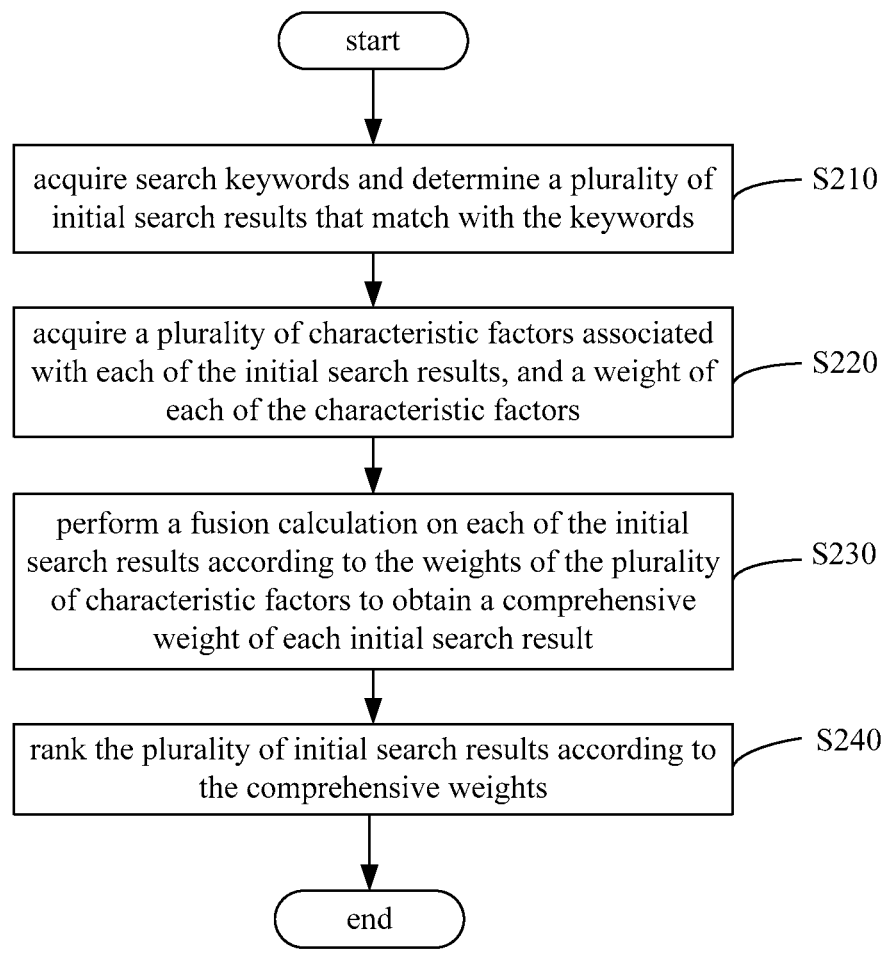
FIG. 2 is a schematic flow chart of a search ranking method according to an embodiment.

In an embodiment, as shown in FIG. 2, a search ranking method is provided, and a description will be given below by using an example in which the method is applied to the server in FIG. 1, wherein the method includes the following steps S210-S240.

Step S210: acquiring search keywords and determining a plurality of initial search results that match with the keywords.

The search keywords are input information entered by the user when searching for relevant information using a search engine, such as words, terms, symbols and the like. Columns in this embodiment include a contact column, a group chat column, and a message column.

Specifically, the search keywords are entered at the terminal, and the terminal acquires the search keywords entered by the user and sends them to a server via the network.

Step S220: acquiring a plurality of characteristic factors associated with each of the initial search results, and a weight of each of the characteristic factors.

The initial search results are text documents matching with the search keywords; a plurality of characteristic factors are acquired from the initial search results, and some information related to the keywords is extracted according to the text documents. In an optional embodiment, the plurality of characteristic factors include at least one of text similarity, chat update time, score of initially recalling search engine, department resemblance, objective importance of contacts, number of chat messages, click rate, and user's relevance degree. In this embodiment, the characteristic factors of the initial search results of each column may be the same or different.

In an optional embodiment, before acquiring the plurality of characteristic factors associated with each of the initial search results and the weight of each of the characteristic factors, the method includes: screening the initial search results. The screening the initial search results include: not ranking users who have resigned and have no chat records, and ranking unregistered users at the end. A chat history may be determined by the chat update time or the position corresponding to the latest message.

Step S230: performing a fusion calculation on each of the initial search results according to the weights of the plurality of characteristic factors to obtain a comprehensive weight of each initial search result.

The initial search results include a plurality of characteristic factors, and the weight of each initial search result is obtained by performing a fusion calculation using the weights of the plurality of characteristic factors.

Step S240: ranking the plurality of initial search results according to the comprehensive weights.

The comprehensive ranking may be performed according to the comprehensive weights in an order from large to small, or may be performed according to the comprehensive weights in an order from small to large. Such a technical solution does not distinguish the ranking manners according to the columns, but performs the ranking according to the weights, so as to quickly find relevant information.

The objects of the initial search results are contacts or groups. The fields included in each initial search result include: object type, object status, object name, score of initially recalling search engine, chat update time, position of the latest message, Chinese pinyin name of the object, English name of the object, and the department in which the object is located, wherein the object type includes a chat application and a mail, and the object status includes whether the object is registered, and whether the object has resigned.

In the above search ranking method, the initial search results are acquired from a plurality of columns to ensure that the acquired information is more comprehensive. In an enterprise communication tool, there may be multiple types of columns, and if one of the columns is missing, search failure may occur; by performing weight calculation based on the initial search results, a unified ranking standard is achieved, which provides a basis for comprehensive ranking; moreover, comprehensive ranking is performed based on the weights, which facilitates users in quickly finding relevant information, simplifies the operation, and improves the searching efficiency.

Figure 3:
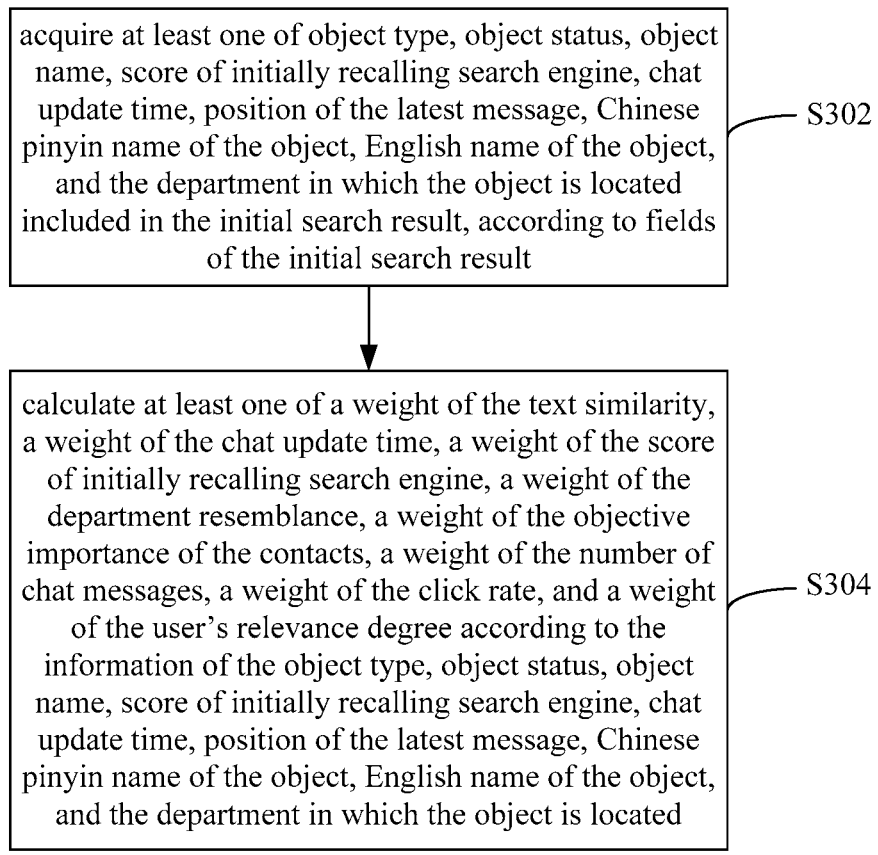
FIG. 3 is a schematic flow chart showing the steps of calculating a weight of a characteristic factor in an embodiment.

In this embodiment, as shown in FIG. 3, the acquiring the plurality of characteristic factors associated with each of the initial search results and the weight of each of the characteristic factors includes:

Step 302: acquiring characteristic factors included in the initial search result according to fields of the initial search result; wherein the fields include at least one of object type, object status, object name, score of initially recalling search engine, chat update time, position of the latest message, Chinese pinyin name of the object, English name of the object, and the department in which the object is located; and Step 304: calculating a weight corresponding to each of the characteristic factors according to the information in the fields; wherein the weight corresponding to the characteristic factor includes at least one of a weight of the text similarity, a weight of the chat update time, a weight of the score of initially recalling search engine, a weight of the department resemblance, a weight of the objective importance of the contacts, a weight of the number of chat messages, a weight of the click rate, and a weight of the user's relevance degree.

In one of the embodiments, the calculating the weight of the text similarity according to the information in the fields includes: calculating a hit ratio, a sequence consistency indicator, a position tightness, and a coverage ratio of the keywords in the initial search results; and calculating the weight of the text similarity according to the hit ratio, the sequence consistency indicator, the position tightness, and the coverage ratio.

The step of calculating the weight of the text similarity according to the hit ratio, the sequence consistency indicator, the position tightness and the coverage ratio includes: acquiring an offset value and a correction value respectively, according to the hit ratio, the sequence consistency indicator, the position tightness, and the coverage ratio; and performing a fusion calculation according to the hit ratio, the sequence consistency indicator, the position tightness, the coverage ratio, the offset value and the correction value to obtain the weight of the text similarity. The offset value and the correction value may be determined by machine learning. The acquiring the offset value and the correction value respectively according to the hit ratio, the sequence consistency indicator, the position tightness and the coverage ratio includes: acquiring the offset value and the correction value according to the hit ratio, acquiring the offset value and the correction value according to the sequence consistency indicator, acquiring the offset value and the correction value according to the position tightness, and acquiring the offset value and the correction value according to the coverage ratio.

In one of the embodiments, the formula of calculating the weight of the text similarity according to the information in the fields specifically is:

text_similar=$(a*hit+b)*(c*sequence+d)*(e*position+f)*(g*cover+h)$; wherein text_similar is the weight of the text similarity, hit is the hit ratio of the text, sequence is the sequence consistency indicator, position is the position tightness, and cover is the coverage ratio; a and b are the offset value and the correction value of the hit ratio, c and d are the offset value and the correction value of the sequence consistency indicator, e and f are the offset value and the correction value of the position tightness, and g and h are the offset value and the correction value of the coverage ratio; wherein a larger offset value indicates a higher importance of the item involved. The hit ratio of the text indicates a ratio of the number of hits of the search keywords in the corresponding text document to the total number of search keywords. Obviously, the higher the ratio is, the closer the initial search result is to the search target. The sequence consistency indicator indicates the consistency of the sequence of the search keywords with the sequence of the search keywords appearing in the corresponding text document, and the sequence consistency is expressed by the ratio of the number of reversed sequences. For example, the number of reversed sequences of (1, 2, 3) is 0, which indicates a most sequenced arrangement, and the number of reversed sequences of (3, 2, 1) is 3, which indicates a least sequenced arrangement. The position tightness indicates a ratio of the number of hit text documents to the sum of the number of hit text documents and the number of hit spacers. For example, for the keywords "Zhang San, Zhang Si, Li Si", the hit initial search results are "Zhang San" and "Li Si's group", the hit keywords are "Zhang San, Li Si", the number t of hit text documents is 2, and the sum of the hit spacers is 1 (since there is a "Zhang Si" between the hit keywords). Therefore, the position tightness=$2/(1+2)=2/3$. The coverage ratio indicates a ratio of hit keywords to the total fields of all hit text documents.

In one of the embodiments, the calculating the weight of the chat update time according to the information in the fields includes: acquiring a time interval between the last chat time and the current time according to the initial search results; and calculating a ratio of an attenuation constant to the sum of the time interval and the attenuation constant to obtain the weight of the chat update time.

The formula of calculating the weight of the chat update time specifically is:

update_time_weight=factor/(factor+update_time_secs);

wherein update_time_weight is the weight of the chat update time. In the update time dimension, factor is a customized attenuation constant, and the unit of the factor is second. Herein, the calculation is performed on a basis of attenuating by a half in 30 days, i.e., factor=$30*24*3600=2592000$.update_time_secs is the number of seconds till now since the last chat time. For example, if the last chat time is 30 days ago, then update_time_secs=$30*24*3600=259200$, then the update time dimension update_time_weight=$259200/(259200+259200)=1/2$.

In one of the embodiments, the calculating the weight of the score of initially recalling search engine according to the information in the fields includes: scoring the initial search results according to a term frequency-inverse document frequency (TF/IDF) model to obtain the weight of the score of initially recalling search engine.

The text document of each initial search result is scored to obtain the weight of the score of initially recalling search engine, and the weight of the score of initially recalling search engine is a floating-point number. The TF/IDF model is mainly used for the scoring strategy. The TF/IDF model is a commonly used weighting technique for information retrieval and data mining. The scoring formula is calculated as follows: the scoring formula is a function of query and document, and is related to a document term direction coordination factor coord, a query norm queryNorm, a term frequency tf, an inverse document frequency idf, the weight boost of lexical items, and a length norm norm. From the formula, some basic rules for the initially recalling search engine can be derived: the more the rare lexical items are matched, the higher the document scores; the shorter the document field is (i.e., including fewer lexical items), the higher the document scores; and the higher the weight of the lexical items is, the higher the document scores.

In one of the embodiments, the calculating the weight of the department resemblance according to the information in the fields includes: comparing a department in the initial search result with a department in which the user currently searching is in; if they are the same department, setting the weight of the department resemblance to 1; and if they are not the same department, setting the weight of the department resemblance to 0.

In enterprise instant messaging (EIM) applications, the probability that a user chats with people in the same department is typically greater than the probability that the user chats with people in other departments. When recalling a plurality of people of the same name, people in the same department are largely close to the search target. Therefore, in the process of calculating the correlation, the departments of the user and the contacts are compared, and if there is an intersection of the departments, the weight of the department is increased.

In one of the embodiments, the calculating the weight of the objective importance of the contacts according to the position level, the ratio of the number of published articles, the concerned data, and the liked data includes: acquiring an offset value and a correction value respectively, according to the position level, the ratio of the number of published articles, the concerned data, and the liked data; and performing a fusion calculation according to the position level, the ratio of the number of published articles, the concerned data, the liked data, the offset value and the correction value to obtain the weight of the objective importance of the contacts. The offset value and the correction value may be determined by machine learning. The acquiring the offset value and the correction value respectively according to the position level, the ratio of the number of published articles, the concerned data, and the liked data includes: acquiring the offset value and the correction value according to the position level; acquiring the offset value and the correction value according to the ratio of the number of published articles; acquiring the offset value and the correction value according to the concerned data; and acquiring the offset value and the correction value according to the liked data.

In one of the embodiments, the formula of calculating the weight of the objective importance of the contacts according to the information in the fields specifically is:

$$\text{static\_weight}=(i*\text{position}+j)*(k*\text{article\_num}+1)*(m*\text{concerned\_num}+n)*(o*\text{liked\_num}+p);$$

wherein static_weight is the weight of the objective importance of the contacts, position is the position level, article_num is the ratio of the number of published articles, concerned_num is the concerned data, and liked_num is the liked data; i and j are the offset value and the correction value of the position level, k and l are the offset value and the correction value of the ratio of the number of published articles, m and n are the offset value and the correction value of the concerned data, and o and p are the offset value and the correction value of the liked data; wherein a larger offset value indicates a higher importance of the item involved. The objective importance is a static dimension, which has nothing to do with the user and the search keywords, and is generally the object that most users know and want to find. Under the same other conditions, the more widely known people are more likely to be ranked ahead, and has a higher objective importance. The weight of the objective importance is obtained by offline calculation and is updated once in a cycle (such as calculated once a week).

In one of the embodiments, the calculating the weight of the number of chat messages according to the information in the fields includes: acquiring a total number of chat messages between the initial search results and the user currently searching; acquiring a parameter r of the total number of chat messages; and calculating the weight of the number of chat messages according to the total number of chat messages and the parameter r, wherein the unit of the parameter r is quantity.

The formula of calculating the weight of the number of chat messages specifically is:

$$\text{message\_num\_weight}=q+\min(\text{message\_num}/r,s);$$

wherein the parameter q is a specific constant, which can be set as needed, the parameter r is a set threshold, and the meaning of the parameter s is a specific constant, which can be set as needed.

As a specific example:

message_num_weight=1+min(message_num/100, 1); wherein message_num_weight is the weight of the number of chat messages, message_num is the total number of chat messages, and parameters q, r and s are 1, 100 and 1 respectively. The number of chat messages between the user currently searching and the contacts is also a factor for measuring the correlation. Under the same other conditions, the search result with a chat message is ranked ahead of the search result without a chat message; the search result with a larger number of chat messages is ranked ahead of the search result with a smaller number of chat messages. When the numbers of chat messages of the search results are both large, the scores may be considered the same. Therefore, the weight of the number of chat messages is calculated by the number of chat messages. When the number of chat messages does not exceed a certain threshold r (such as 100), a linear formula is used for fitting; and when it is greater than the threshold r (such as 100), a preset maximum value is taken for the weight of the number of chat messages.

In one of the embodiments, the calculating the weight of the click rate according to the information in the fields includes: acquiring the number of user clicks of the initial search results; and assigning a value to the weight of the click rate according to the number of user clicks; wherein the weight of the click rate is in direct proportional to the number of user clicks. The currently searching user's clicks of the results also often reflect the quality of the initial search results. For the initial search results clicked at a high frequency, the weights thereof are increased, and they are displayed preferentially at the time of ranking. The Click-Heat of the initial search results may be calculated in real time. For example, in a certain period of time, if a certain popular person is clicked for many times, it can be ranked ahead immediately. Currently, the number of clicks of the initial search results is recorded in a database, and the ranking of each initial search result can be calculated by scanning the number of clicks of the initial search results in real time so that a weight proportional to the ranking is assigned.

In one of the embodiments, the calculating the weight of the user's relevance degree according to the information in the fields includes: calculating the number of common contacts, the characteristic number of common departments, the characteristic number of common office locations, and the number of common personal tags of the initial search results and the user currently searching; and calculating the weight of the user's relevance degree according to the number of common contacts, the characteristic number of common departments, the characteristic number of common office locations, and the number of common personal tags. The user's relevance degree may describe the common characteristics of the user and the contacts corresponding to the initial search results, such as a person who has been contacted in common, a common personal tag, and the like. The more the common people contacted by the user and the contacts corresponding to the initial search results are, the closer the contacts are to the search target. By calculating the weight of the user's relevance degree, the user's personalized search can be optimized, and the initial search results with similar preferences to the user may be preferentially presented. Optionally, the weight of user's relevance degree is calculated by offline data mining.

In this embodiment, the performing fusion calculation on each of the initial search results according to the weights of the plurality of characteristic factors to obtain the comprehensive weight of each initial search result includes: acquiring an offset value and a correction value respectively, according to each of the characteristic factors of the initial search result; obtaining a fusion coefficient by calculating a sum of a product of the characteristic factor and the corresponding offset value, and the corresponding correction value; and multiplying the fusion coefficients of the plurality of characteristic factors to obtain the comprehensive weight of the initial search result. The offset value and the correction value may be determined by machine learning.

The formula of calculating the comprehensive weight is as follows:

weight=(a1*text_weight+b1)*(a2*update_time_weight+b2)*(a3*es_score+b3)*(a4*department_weight+b4)*(a5*static_weight+b5)*(a6*message_num_weight+b6)*(a7*click_rate+b7)*(a8*user_relevant+b8); wherein weight represents the comprehensive weight, text_weight represents the weight of the text similarity, update_time_weight represents the weight of the chat update time, es_score represents the weight of the score of initially recalling search engine, department_weight represents the weight of the department resemblance, static_weight represents the weight of the objective importance of the contacts, message_num_weight represents the weight of the number of chat messages, click_rate represents the weight of the click rate, and user_relevant represents the weight of the user's relevance degree. In the formula, each parentheses includes therein a calculation of the fusion coefficient, wherein text_weight represents the weight of the text similarity, a1 is the offset value, b1 is the correction value, and a first fusion coefficient is calculated by a1*text_weight+b1; update_time_weight represents the weight of the chat update time, a2 is the offset value, b2 is the correction value, and a second fusion coefficient is calculated by a2*update_time_weight+b2; and a plurality of fusion coefficients are multiplied to obtain the comprehensive weight of the initial search result. In the formula, each of a1, a2, a3, a4, a5, a6, a7 and a8 is an offset value, and each of b1, b2, b3, b4, b5, b6, b7 and b8 is a correction value.

It should be understood that although the various steps in the flow charts of FIGS. 2-3 are sequentially displayed as indicated by the arrows, these steps do not necessarily have to be executed in the order indicated by the arrows. Unless explicitly stated herein, the execution of these steps is not strictly limited by any order, and they may be executed in other orders. Moreover, at least some of the steps in FIGS. 2-3 may include a plurality of sub-steps or stages, which are not necessarily executed or completed at the same time instants, but may be executed at different time instants. These sub-steps or stages are not necessarily executed sequentially, but may be executed alternately with at least a portion of other steps or at least a portion of sub-steps or stages of other steps.

Figure 4:
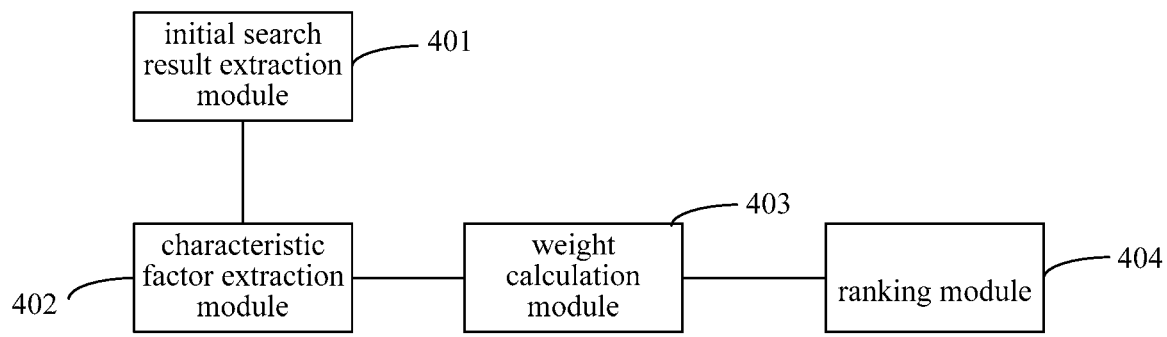
FIG. 4 is a structural block diagram of a search ranking apparatus according to an embodiment.

In one embodiment, as shown in FIG. 4, a search ranking apparatus 400 is provided, which includes: an initial search result extraction module 401, a characteristic factor extraction module 402, a weight calculation module 403, and a ranking module 404.

The initial search result extraction module 401 is configured to acquire search keywords and determine a plurality of initial search results that match with the keywords.

The search keywords are input information entered by the user when searching for relevant information using a search engine, such as words, terms, symbols and the like. Columns in this embodiment include a contact column, a group chat column, and a message column.

Specifically, the search keywords are entered at the terminal, and the terminal acquires the search keywords entered by the user and sends them to a server via the network.

The characteristic factor extraction module 402 is configured to acquire a plurality of characteristic factors associated with each of the initial search results, and a weight of each of the characteristic factors.

The initial search results are text documents matching with the search keywords; a plurality of characteristic factors are extracted from the initial search results, and some information related to the keywords is extracted according to the text documents. In an optional embodiment, the plurality of characteristic factors include one or more of text similarity, chat update time, score of initially recalling search engine, department resemblance, objective importance of contacts, number of chat messages, click rate, and user's relevance degree. In this embodiment, the characteristic factors of the initial search results of each column may be the same or different.

The weight calculation module 403 is configured to perform a fusion calculation on each of the initial search results according to the weights of the plurality of characteristic factors to obtain a comprehensive weight of each initial search result.

Each initial search result includes a plurality of characteristic factors, and the weights of the plurality of characteristic factors are used for fusion calculation to obtain the weight of each initial search result.

The ranking module 404 is configured to comprehensively rank the initial search results of the plurality of columns according to the magnitudes of the weights.

The comprehensive ranking may be performed according to the comprehensive weights in an order from large to small, or may be performed according to the comprehensive weights in an order from small to large. Such a technical solution does not distinguish the ranking manners according to the columns, but performs the ranking according to the weights, so as to quickly find relevant information.

The objects of the initial search results are contacts or groups. The fields included in each initial search result include: object type, object status, object name, score of initially recalling search engine, chat update time, position of the latest message, Chinese pinyin name of the object, English name of the object, and the department in which the object is located, wherein the object type includes a chat application and a mail, and the object status includes whether the object is registered, and whether the object has resigned.

In the above search ranking apparatus, the initial search results are acquired from a plurality of columns to ensure that the acquired information is more comprehensive. In an enterprise communication tool, there may be multiple types of columns, and if one of the columns is missing, search failure may occur; by performing weight calculation based on the initial search results, a unified ranking standard is achieved, which provides a basis for comprehensive ranking; moreover, comprehensive ranking is performed based on the weights, which facilitates users in quickly finding relevant information, simplifies the operation, and improves the searching efficiency.

For the specific definition of the search ranking apparatus, reference may be made to the above definition of the search ranking method, and details are not described herein again. The various modules in the above search ranking apparatus may be implemented entirely or partially by software, hardware, and a combination thereof. Each of the above modules may be embedded in or independent from a processor of an electronic device in a form of hardware, or may be stored in a memory of an electronic device in a form of software so as to be called by the processor to perform operations corresponding to the above various modules.

Figure 5:
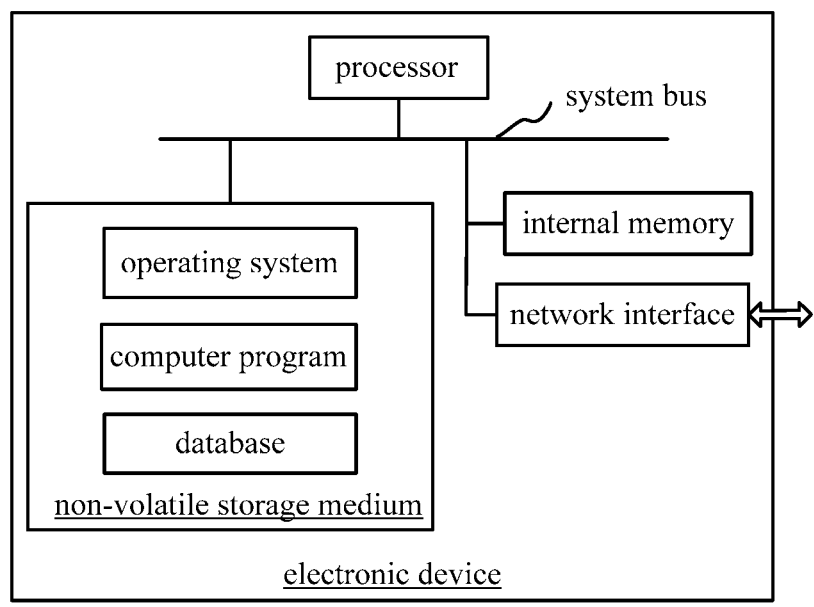
FIG. 5 is an internal structure diagram of an electronic apparatus according to an embodiment.

In an embodiment, an electronic device is provided, which may be a server, and an internal structure diagram thereof may be as shown in FIG. 5. The electronic device includes a processor, a memory, a network interface and a database that are connected by a system bus. The processor of the electronic device is configured to provide computing and control capabilities. The memory of the electronic device includes a non-volatile storage medium and an internal memory. The non-volatile storage medium has an operating system, a computer program and a database stored thereon. The internal memory provides an environment for operation of the operating system and the computer program on the non-volatile storage medium. The database of the electronic device is configured to store text data. The network interface of the electronic device is configured to communicate with an external terminal via a network connection. The computer program is executed by the processor to implement a search ranking method.

It can be understood by those skilled in the art that the structure shown in FIG. 5 is only a block diagram of a part of the structure related to the solution of the present application, and does not constitute a limitation on the electronic device to which the solution of the present application is applied. The specific electronic device may include more or fewer components than those shown in the figures, or it may be combined with certain components, or it may have a different arrangement of components.

In an embodiment, an electronic device is provided, which includes a memory and a processor, wherein the memory has a computer program stored therein, and when the computer program is executed by the processor, the following steps are implemented: acquiring search keywords and determining a plurality of initial search results that match with the keywords; acquiring a plurality of characteristic factors associated with each of the initial search results, and a weight of each of the characteristic factors; performing a fusion calculation on each of the initial search results according to the weights of the plurality of characteristic factors to obtain a comprehensive weight of each initial search result; and ranking the plurality of initial search results according to the comprehensive weights.

In an embodiment, a computer readable storage medium is provided, which has a computer program stored thereon, wherein when the computer program is executed by a processor, the following steps are implemented: acquiring search keywords and determining a plurality of initial search results that match with the keywords; acquiring a plurality of characteristic factors associated with each of the initial search results, and a weight of each of the characteristic factors; performing a fusion calculation on each of the initial search results according to the weights of the plurality of characteristic factors to obtain a comprehensive weight of each initial search result; and ranking the plurality of initial search results according to the comprehensive weights.

It can be understood by those skilled in the art that all or part of the flow charts of implementing the methods of the above embodiments may be completed by a computer program instructing relevant hardware, and the computer program may be stored in a non-volatile computer readable storage medium. When executed, the computer program may include the flow charts of the embodiments of the methods described above. Any reference to a memory, storage, database or other medium used in the various embodiments provided by the present application may include non-volatile memory and/or volatile memory. The non-volatile memory may include read-only memory (ROM), programmable ROM (PROM), electrically programmable ROM (EPROM), electrically erasable programmable ROM (EEPROM), or flash memory. The volatile memory may include random access memory (RAM) or external cache memory. By way of illustration without limitation, RAM is available in a variety of forms, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAIVI), Memory Bus (Rambus) Direct RAM (RDRAM), Direct Memory Bus Dynamic RAM (DRDRAM), and Memory Bus Dynamic RAM (RDRAM), etc.

The technical features of the above embodiments may be arbitrarily combined. For the sake of brevity of description, not all possible combinations of the technical features in the above embodiments are described. However, as long as there is no contradiction in the combination of these technical features, it should be considered as falling within the scope described in this specification.

The above described embodiments are merely illustrative of several implementations of the present application, and the description thereof is more specific and detailed, but it is not to be construed as limiting the scope of the present application. It should be noted that several variations and modifications may also be made by those skilled in the art without departing from the spirit and scope of the present application, and all these variations and modifications will fall within the scope of protection of the present application. Therefore, the scope of protection of the present application should be determined by the appended claims.

What is claimed is:

1. A search ranking method, comprising:
acquiring search keywords and determining a plurality of initial search results that match with the keywords;
acquiring a plurality of characteristic factors associated with each of the initial search results, and a weight of each of the plurality of characteristic factors;
performing a fusion calculation on each of the initial search results according to the weights of the plurality of characteristic factors to obtain a comprehensive weight of each of the initial search results, wherein the performing a fusion calculation on each of the initial search results according to the weights of the plurality of characteristic factors to obtain a comprehensive weight of each of the initial search results further comprises:
acquiring an offset value and a correction value respectively, according to each of the plurality of characteristic factors of each of the initial search results;
obtaining a fusion coefficient of each of the plurality of characteristic factors by calculating a sum of a product of the weight of each of the plurality of characteristic factors and the offset value corresponding to each of the plurality of characteristic factors, and the correction value corresponding to each of the plurality of characteristic factors; and
multiplying the fusion coefficient of each of the plurality of characteristic factors to obtain the comprehensive weight of each of the initial search results; and
ranking the plurality of initial search results according to the comprehensive weights.

2. The method according to claim 1, wherein the plurality of characteristic factors comprise at least some of text similarity, chat update time, score of initially recalling search engine, department resemblance, objective importance of contacts, number of chat messages, click rate, and user's relevance degree;
the acquiring the plurality of characteristic factors associated with each of the initial search results and the weight of each of the characteristic factors comprises:
acquiring the plurality of characteristic factors included in each initial search result according to fields of the initial search result; wherein the fields comprise at least some of object type, object status, object name, score of initially recalling search engine, chat update time, position of the latest message, Chinese pinyin name of the object, English name of the object, and the department in which the object is located; and calculating a weight corresponding to each of the plurality of characteristic factors respectively according to the information in the fields; wherein the weight corresponding to each characteristic factor comprises at least one of a weight of the text similarity, a weight of the chat update time, a weight of the score of initially recalling search engine, a weight of the department resemblance, a weight of the objective importance of contacts, a weight of the number of chat messages, a weight of the click rate, and a weight of the user's relevance degree.

3. The method according to claim 2, wherein the calculating the weight of the text similarity comprises:

calculating a hit ratio, a sequence consistency indicator, a position tightness, and a coverage ratio of the keywords in the initial search results; and calculating the weight of the text similarity according to the hit ratio, the sequence consistency indicator, the position tightness, and the coverage ratio.

4. The method according to claim 3, wherein the step of calculating the weight of the text similarity according to the hit ratio, the sequence consistency indicator, the position tightness and the coverage ratio comprises:

acquiring an offset value and a correction value respectively, according to the hit ratio, the sequence consistency indicator, the position tightness, and the coverage ratio; and performing a fusion calculation according to the hit ratio, the sequence consistency indicator, the position tightness, the coverage ratio, the offset value and the correction value to obtain the weight of the text similarity.

5. The method according to claim 2, wherein the calculating the weight of the chat update time comprises:

acquiring a time interval between the last chat time and the current time according to the initial search results; and calculating a ratio of an attenuation constant to the sum of the time interval and the attenuation constant to obtain the weight of the chat update time.

6. The method according to claim 2, wherein the calculating the weight of the score of initially recalling search engine comprises:

scoring the initial search results according to a term frequency-inverse document frequency model to obtain the weight of the score of initially recalling search engine.

7. The method according to claim 2, wherein the calculating the weight of the department resemblance comprises:

comparing a department in the initial search result with a department in which the user currently searching is in;

if they are the same department, setting the weight of the department resemblance to 1; and if they are not the same department, setting the weight of the department resemblance to 0.

8. The method according to claim 2, wherein the calculating the weight of the objective importance of the contacts comprises:

acquiring a position level, a ratio of the number of published articles, concerned data, and liked data of the initial search results; and calculating the weight of the objective importance of the contacts according to the position level, the ratio of the number of published articles, the concerned data, and the liked data.

9. The method according to claim 8, wherein the calculating the weight of the objective importance of the contacts according to the position level, the ratio of the number of published articles, the concerned data, and the liked data comprises:

acquiring an offset value and a correction value respectively, according to the position level, the ratio of the number of published articles, the concerned data, and the liked data; and performing a fusion calculation according to the position level, the ratio of the number of published articles, the concerned data, the liked data, the offset value and the correction value to obtain the weight of the objective importance of the contacts.

10. The method according to claim 2, wherein the calculating the weight of the number of chat messages comprises:

acquiring a total number of chat messages between the initial search results and the user currently searching;

acquiring a parameter r of the total number of chat messages; and calculating the weight of the number of chat messages according to the total number of chat messages and the parameter r; wherein the unit of the parameter r is quantity.

11. The method according to claim 2, wherein the calculating the weight of the click rate comprises:

acquiring the number of user clicks of the initial search results; and assigning a value to the weight of the click rate according to the number of user clicks;

wherein the weight of the click rate is in direct proportional to the number of user clicks.

12. The method according to claim 2, wherein the calculating the weight of the user's relevance degree comprises:

calculating the number of common contacts, the characteristic number of common departments, the characteristic number of common office locations, and the number of common personal tags of the initial search results and the user currently searching; and calculating the weight of the user's relevance degree according to the number of common contacts, the characteristic number of common departments, the characteristic number of common office locations, and the number of common personal tags.

13. A search ranking apparatus, comprising:

at least one processor; and at least one memory communicatively coupled to the at least one processor and storing instructions that upon execution by the at least one processor cause the apparatus to:

acquire search keywords and determine a plurality of initial search results that match with the keywords;

acquire a plurality of characteristic factors associated with each of the initial search results, and a weight of each of the plurality of characteristic factors;

perform a fusion calculation on each of the initial search results according to the plurality of characteristic factors and the weight of each of the plurality of characteristic factors to obtain a comprehensive weight of each of the initial search results, wherein the performing a fusion calculation on each of the initial search results according to the plurality of characteristic factors and the weight of each of the plurality of characteristic factors to obtain a comprehensive weight of each of the initial search results further comprises:
- acquiring an offset value and a correction value respectively, according to each of the plurality of characteristic factors of each of the initial search results;
- obtaining a fusion coefficient of each of the plurality of characteristic factors by calculating a sum of a product of the weight of each of the plurality of characteristic factors and the offset value corresponding to each of the plurality of characteristic factors, and the correction value corresponding to each of the plurality of characteristic factors; and
- multiplying the fusion coefficient of each of the plurality of characteristic factors to obtain the comprehensive weight of each of the initial search results; and rank the plurality of initial search results according to the comprehensive weights.

14. The apparatus according to claim 13, wherein the plurality of characteristic factors comprise at least some of text similarity, chat update time, score of initially recalling search engine, department resemblance, objective importance of contacts, number of chat messages, click rate, and user's relevance degree;
   the processor is configured to execute the computer readable instructions to further perform operations of:
   acquiring the plurality of characteristic factors included in each initial search result according to fields of the initial search result; wherein the fields comprise at least some of object type, object status, object name, score of initially recalling search engine, chat update time, position of the latest message, Chinese pinyin name of the object, English name of the object, and the department in which the object is located; and
   calculating a weight corresponding to each of the plurality of characteristic factors respectively according to the information in the fields; wherein the weight corresponding to each characteristic factor comprises at least one of a weight of the text similarity, a weight of the chat update time, a weight of the score of initially recalling search engine, a weight of the department resemblance, a weight of the objective importance of contacts, a weight of the number of chat messages, a weight of the click rate, and a weight of the user's relevance degree.

15. The apparatus according to claim 14, wherein the processor is configured to execute the computer readable instructions to further perform operations of:
   calculating a hit ratio, a sequence consistency indicator, a position tightness, and a coverage ratio of the keywords in the initial search results; and
   calculating the weight of the text similarity according to the hit ratio, the sequence consistency indicator, the position tightness, and the coverage ratio.

16. The apparatus according to claim 15, wherein the processor is configured to execute the computer readable instructions to further perform operations of:

acquiring an offset value and a correction value respectively, according to the hit ratio, the sequence consistency indicator, the position tightness, and the coverage ratio; and
performing a fusion calculation according to the hit ratio, the sequence consistency indicator, the position tightness, the coverage ratio, the offset value and the correction value to obtain the weight of the text similarity.

17. The apparatus according to claim 14, wherein the processor is configured to execute the computer readable instructions to further perform operations of:
   acquiring a time interval between the last chat time and the current time according to the initial search results; and
   calculating a ratio of an attenuation constant to the sum of the time interval and the attenuation constant to obtain the weight of the chat update time.

18. The apparatus according to claim 14, wherein the processor is configured to execute the computer readable instructions to further perform operations of:
   scoring the initial search results according to a term frequency-inverse document frequency model to obtain the weight of the score of initially recalling search engine.

19. A non-transitory computer readable storage medium having a computer program stored thereon, wherein when the computer program is executed by a processor, causing the processor to perform operations, the operations comprising:
   acquiring search keywords and determining a plurality of initial search results that match with the keywords;
   acquiring a plurality of characteristic factors associated with each of the initial search results, and a weight of each of the plurality of characteristic factors;
   performing a fusion calculation on each of the initial search results according to the weights of the plurality of characteristic factors to obtain a comprehensive weight of each of the initial search results, wherein the performing a fusion calculation on each of the initial search results according to the weights of the plurality of characteristic factors to obtain a comprehensive weight of each of the initial search results further comprises:
     acquiring an offset value and a correction value respectively, according to each of the plurality of characteristic factors of each of the initial search results;
     obtaining a fusion coefficient of each of the plurality of characteristic factors by calculating a sum of a product of the weight of each of the plurality of characteristic factors and the offset value corresponding to each of the plurality of characteristic factors, and the correction value corresponding to each of the plurality of characteristic factors; and
     multiplying the fusion coefficient of each of the plurality of characteristic factors to obtain the comprehensive weight of each of the initial search results; and
   ranking the plurality of initial search results according to the comprehensive weights.

* * * * *